US007753261B2

(12) United States Patent
Rosenblatt et al.

(10) Patent No.: US 7,753,261 B2
(45) Date of Patent: Jul. 13, 2010

(54) SYSTEMS AND METHODS FOR AUTOMATICALLY PREVENTING DELINQUENCY OF PAYMENT ON FINANCIAL ACCOUNTS

(75) Inventors: Charles Rosenblatt, Richmond, VA (US); Frank Rotman, Manakin Sabot, VA (US); Vikas Goel, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 1000 days.

(21) Appl. No.: 11/167,259

(22) Filed: Jun. 28, 2005

(65) Prior Publication Data
US 2006/0293983 A1    Dec. 28, 2006

(51) Int. Cl.
*G06K 5/00* (2006.01)
(52) U.S. Cl. ........................ 235/380; 235/379
(58) Field of Classification Search ................ 235/380, 235/379, 382, 385
See application file for complete search history.

(56) References Cited

U.S. PATENT DOCUMENTS

| 5,504,677 | A |  | 4/1996 | Pollin |  |
| 5,893,080 | A |  | 4/1999 | McGurl et al. |  |
| 6,052,671 | A |  | 4/2000 | Crooks et al. |  |
| 6,298,335 | B1 |  | 10/2001 | Bernstein |  |
| 6,304,860 | B1 |  | 10/2001 | Martin, Jr. et al. |  |
| 6,577,304 | B1 | * | 6/2003 | Yablonski et al. | 345/419 |
| 7,194,426 | B1 | * | 3/2007 | Box | 705/26 |
| 7,289,794 | B2 | * | 10/2007 | Bowne et al. | 455/414.1 |
| 7,318,046 | B1 | * | 1/2008 | Wellons et al. | 705/38 |
| 2002/0042773 | A1 | * | 4/2002 | Fugitte et al. | 705/39 |
| 2003/0074290 | A1 | * | 4/2003 | Clore | 705/35 |
| 2004/0015438 | A1 |  | 1/2004 | Compiano et al. |  |
| 2004/0088261 | A1 | * | 5/2004 | Moore et al. | 705/64 |

OTHER PUBLICATIONS

Wells Fargo Small Business—Credit Cards—Autopayment [online] 2004 [retrieved on Nov. 30, 2004] retrieved from http://www.wellsfargo.com/biz/products/credit/cards/autopayment.jhtml.
John Synott, Credit Charge Slug on the Cards [online] Oct. 4, 1998 [retrieved on Nov. 30, 2004] retrieved from http://global.factiva.com/en/arch/save_results.asp.

* cited by examiner

*Primary Examiner*—Daniel St.Cyr
(74) *Attorney, Agent, or Firm*—Finnegan, Henderson, Farabow, Garrett & Dunner, L.L.P.

(57) ABSTRACT

Methods and systems are disclosed for automatically preventing delinquency of payment on financial accounts. In one implementation, methods or systems may be provided for associating a credit cardholder's account to the cardholder's bank account. If the cardholder fails to make a required monthly payment on the credit card account, the required payment is automatically withdrawn from the bank account prior to credit card account being reported as delinquent.

22 Claims, 5 Drawing Sheets

NO-DELINQUECNY PARAMETERS
128

| CARDHOLDER 310 | CREDIT ACCOUNT NO. 315 | BANK ACCOUNT NO. 320 | ACCT. TYPE 325 | ACCOUNT LIMITS 330 | PERIODICITY 335 | PAYMENT DATE 340 | PAYMENT AMT. 345 | NOTICE 350 | AUTHORIZATION 355 | AUTHORIZATION METHOD 360 |
|---|---|---|---|---|---|---|---|---|---|---|
| CARDHOLDER-01 | 000-0000-01 | 16822631 | CHECKING | NO LIMIT | MONTHLY | MONTHLY, 3 DAY PRIOR TO DELINQUENCY DATE | $0 OR MINIMUM AMOUNT | NONE | NO | TELEPHONE |
| CARDHOLDER-02 | 000-0000-02 | 1152603 | CHECKING | NO LIMIT | MONTHLY | EVERY MONTH, 2ND MONDAY | $500 | NONE | NO | N/A |
| CARDHOLDER-03 | 000-0000-03 | 40843157 | CHECKING | $500 MIN. BALANCE | MONTHLY | MONTHLY, 10 DAY PRIOR TO DELINQUENCY DATE | $0 OR MIN. AMT. FOR CURRENT AND PREVIOUS PERIOD | IF ACCOUNT WILL DROP BELOW MINIMUM BALANCE | YES | EMAIL |
| CARDHOLDER-04 | 000-0000-04 | 41772881 | CHECKING | $500 MIN. BALANCE | MONTHLY | MONTHLY, 10 DAY PRIOR TO DELINQUENCY DATE | $0 OR MIN. AMT. FOR CURRENT AND PREVIOUS PERIOD | IF ACCOUNT BELOW MINIMUM BALANCE | YES | EMAIL |
| CARDHOLDER-05 | 000-0000-05 | 72598281 | LINE OF CREDIT | $10,000 MAX CREDIT | MONTHLY | 14 DAY PRIOR | $0 OR TWICE MINIMUM AMOUNT | IF PAYMENT WILL EXCEED CREDIT | | MAIL |
| CARDHOLDER-06 | 000-0000-06 | 8853658 | DRAFT | NO LIMIT | MONTHLY | WITHIN LAST WEEK OF PERIOD | $500 | NONE | NO | WEBSITE |
| CARDHOLDER-07 | 000-0000-07 | 72803660 | CHECKING | NO LIMIT | AS NEEDED | THIRD WEEK OF PERIOD | <$1000 | IF MINIMUM AMOUNT GREATER THEN MAX PAYMENT AMOUNT | YES | ANY |
| CARDHOLDER-08 | 000-0000-08 | 7974891 | CHECKING | NO LIMIT | MONTHLY | FIRST WEEK OF PERIOD | NO LIMIT | NONE | NO | N/A |
| CARDHOLDER-09 | 000-0000-09 | 42534317 | SAVINGS | $500 MIN. BALANCE | AS NEEDED | 10 DAY PRIOR TO DELINQUENCY DATE | UP TO MINIMUM BALANCE | ONLY IF PAYMENT EXCEEDS MINIMUM BALANCE | YES | ANY |
| CARDHOLDER-10 | 000-0000-10 | 50656317 | CHECKING | $500 MAX OVERDRAW | AS NEEDED | 14 DAY PRIOR TO DELINQUENCY DATE | UP TO MAXIMUM OVERDRAFT | ONLY IF PAYMENT EXCEEDS OVERDRAFT LIMIT | YES | ANY |

SYSTEMS AND METHODS FOR AUTOMATICALLY PREVENTING DELINQUENCY OF PAYMENT ON FINANCIAL ACCOUNTS

TECHNICAL FIELD

The present invention generally relates to credit cards products and similar financial products. More particularly, the invention relates to systems and methods for automatically transferring funds from a bank account or other financial account to a credit account to avoid reporting of delinquency to a credit agency.

BACKGROUND

Credit card products have become so ubiquitous that they have fundamentally changed the manner in which financial transactions and dealings are viewed and conducted in society today. Credit card products are most commonly represented by plastic card-like members that are provided to customers through financial account providers, such as banks and other financial institutions.

With a credit card, an authorized customer or cardholder is capable of purchasing services or merchandise without an immediate, direct exchange of cash. With each purchase, the cardholder incurs debt to their credit card account, which the cardholder may thereafter pay upon receipt of a periodic statement. In most cases, the cardholder will have the option to either fully pay the outstanding balance or, as a matter of necessity or choice, defer a portion of the balance for later payment with accompanying interest or finance charges for the period during which an outstanding account balance is maintained.

Failure to promptly pay the required portion of an outstanding credit card account balance has a negative impact on a the cardholder's credit rating. Generally, a person's credit rating indicates the perceived risk in issuing that person credit. Creditors rely on credit ratings in determining not only whether to issue the person credit, but also the interest rate charged for that credit. Typically, credit reporting agencies calculate a credit rating by collecting information reflecting a person's creditworthiness including, in order of importance, punctuality of past payments, current debt, length of credit history, types of loans and credit, amounts of loans and credit in the recent past. Based on this information, a credit agency calculates a "credit score" which is a numerical index representing a person's financial creditworthiness. In other words, a credit score measures the risk that a person will fail to pay back a loan to a creditor. Given the weight of punctuality in determining a cardholder's credit score, it is important to ensure that the required amount due on the outstanding account balance is paid before any delinquency is reported to a credit agency.

Financial account providers offer a variety of services to assist their customers in making timely payment of debts. The most familiar of these are overdraft protection systems, wherein banks provide instant loans to cover any overdraw on a customer's draft account to prevent the customer's draft from being refused for insufficient funds. By taking advantage of overdraft services, bank customers protect their financial reputation from being injured due to a rejected draft. For the bank, overdraft protection systems enhance revenue due to the fees and interest charged for the service.

Some banks offer overdraft-type services for credit cards in which funds are automatically withdrawn from the cardholder's account to pay the minimum monthly payment due on their credit card. If the cardholder's account has insufficient funds to cover the credit card's minimum required payment, the bank loans the cardholder funds to cover the overdraw. By this method, cardholders benefit by avoiding the high interest rates charged on the credit account balance and, furthermore, prevent their account from becoming delinquent. Banks also benefit from the enhanced revenue generated by the fees and interest that might otherwise be earned by the credit card issuer.

Other examples of systems designed to assist in timely payment of debts include online banking systems which enable customers to schedule automatic payments of bills from a bank account. Similarly, financial services providers offer automatic credit card payment systems in which a credit card is automatically paid from an enrolled cardholder's bank account. Cardholders may, for example, arrange to automatically pay various amounts of their credit card balance including the minimum balance due, a fixed amount, or the entire balance of the credit card account. These services benefit cardholders by assisting them in maintaining a good credit rating by ensuring that credit card accounts are paid in a timely fashion.

Although cardholders appreciate the benefits offered by systems that ensure their credit cards do not become delinquent, they often dislike having their bank accounts automatically debited periodically and prefer to pay their bills directly. Thus, there is a need to offer a service that protects cardholder's credit rating while providing greater flexibility. Further, there is a need for a service that protects a cardholder's credit rating by ensuring, for example, that a required payment is transferred to the cardholder's account when the account is in danger of being reported as delinquent to a credit agency, without automatically transferring funds each period.

SUMMARY

Embodiments of the present invention include methods and systems for associating a cardholder's credit account with a bank account, and automatically transferring required funds before the cardholder's credit card account is reported delinquent to a credit agency.

In embodiments of the present invention, a credit card provider enrolls cardholders in a no-delinquency service. Upon enrollment, the cardholder's bank account is associated with the cardholder's credit card account. Parameters under which the no-delinquency service operates may be determined at the time of the cardholder's enrollment. Alternatively, the parameters may be determined in advance by the creditor. During enrollment, the cardholder authorizes the credit card provider to debit his or her bank account. In one embodiment, the cardholder authorizes the credit card provider to debit the cardholder's bank account every month. As such, no future authorization is required when the no-delinquency service debits the bank account to avoid reporting of the cardholder's delinquency. In another embodiment, the creditor may be required to obtain cardholder authorization each time the bank account is debited, such as in cases of irregular debits. Prior to transferring funds, the credit card provider may send notice to the cardholder of the impending delinquency, thereby giving the cardholder an opportunity to preempt the no-delinquency service by paying the amount due on the credit card personally.

In one embodiment, the no-delinquency service does not transfer funds from the cardholder's bank account each month. Instead, the system transfers funds from the bank account only when the report to a credit agency is imminent (e.g., greater than 30 days overdue). Of course, if desired, the no-delinquency service may operate as a typical automatic payment system, in which the creditor automatically debits the credit cardholder's bank account each period for a particular amount.

Both the foregoing general description and the following detailed description are exemplary and are intended to provide further illustrations and explanation of the embodiments of the invention as claimed.

BRIEF DESCRIPTION OF THE DRAWINGS

The accompanying drawings, which are incorporated in and constitute a part of this specification, show certain aspects of the present invention and, together with the description, help explain some of the principles associated with the invention.

FIG. 3 illustrates a schematic of an exemplary database of cardholder information maintained by a creditor, consistent with an embodiment of the present invention;

DETAILED DESCRIPTION

The following description refers to the accompanying drawings in which the same numbers in different drawings represent similar elements unless otherwise represented. The implementations set forth in the following description do not represent all implementations consistent with the claimed invention. Instead, they are merely examples of systems and methods consistent with certain aspects related to the invention.

Overview

Methods and systems consistent with embodiments of the present invention may provide an automated service for conditionally debiting funds from a cardholder's bank account and transferring the funds to the cardholder's credit account to prevent a creditor from reporting the cardholder as delinquent on his reoccurring payments to a credit tracking agency. While the above-mentioned functionality is described below with reference to credit card accounts, embodiments of the invention may be implemented for other types of credit accounts, financial accounts, or financial products such as loans or mortgages. Additional aspects, features, and embodiments of the present invention are also described below.

Figure 1:
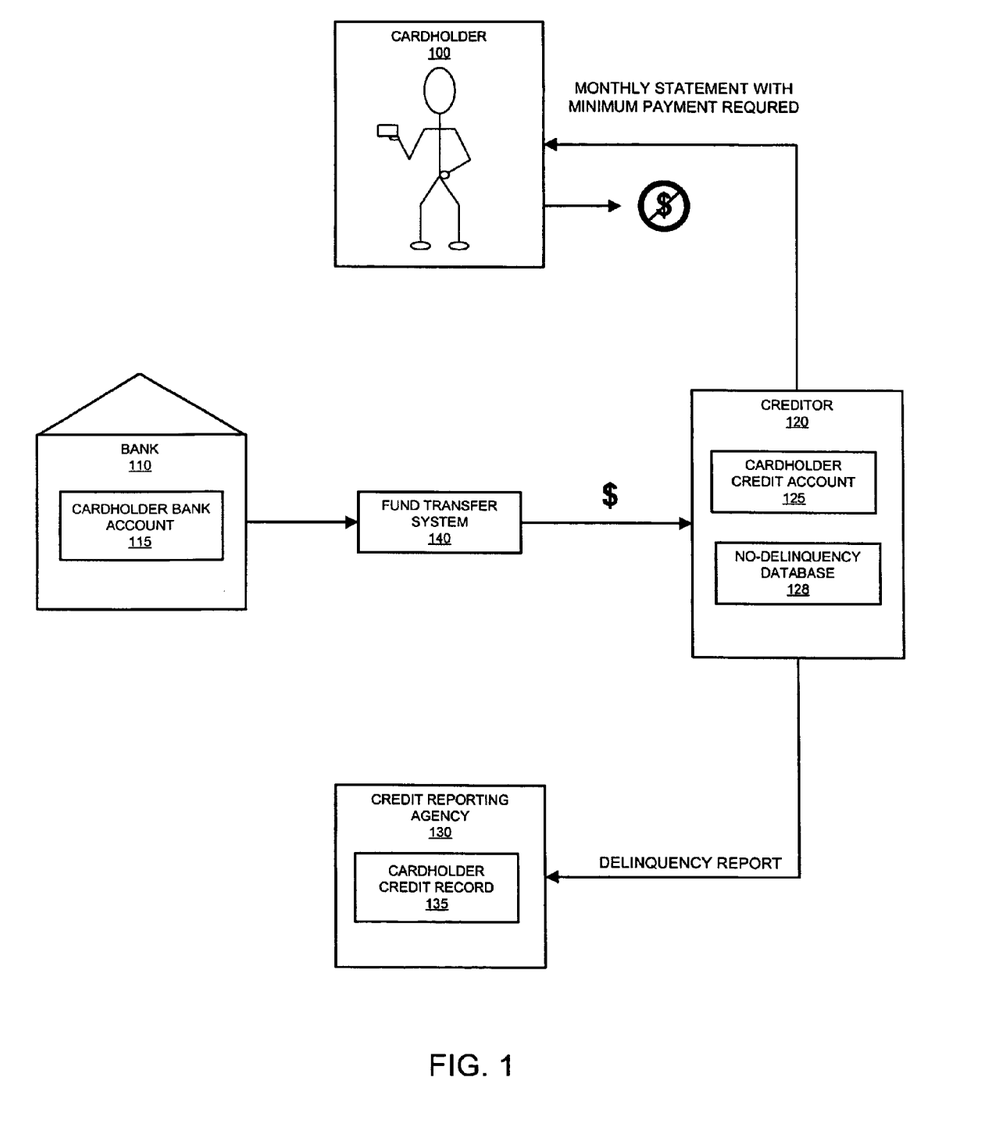
FIG. 1 illustrates a block diagram of an exemplary environment for implementing embodiments consistent with the present invention.

FIG. 1 illustrates an exemplary environment for implementing embodiments consistent with the present invention. Cardholder 100 is a person who establishes an account with a creditor. Although the cardholder 100 is typically an individual consumer, "cardholder" may be a corporation, business trust, estate, trust, partnership, limited liability company, association, joint venture, government, governmental subdivision, agency, or instrumentality, public corporation, or any other legal or commercial entity.

Bank 110 may be any entity engaged in the business of banking or lending monies, including a savings bank, a savings and loan association, a credit union, and a trust company.

"Bank account" means any deposit account with bank 110, including a demand, time, savings, passbook, share draft, or the like.

Creditor 120 may be any financial service provider offering revolving credit repeatedly available up to a specified amount and requiring periodic repayments. For instance, creditor 120 may be an issuer of credit cards. Alternatively, creditor 120 may be any financial service provider offering credit requiring periodic repayments.

Credit reporting agency 130 is a business entity or service that assess the creditworthiness of cardholder 100; for example, EQUIFAX, EXPERIAN, or TRANS UNION. A cardholder's credit rating is based upon the cardholder's history of borrowing and repayment of the credit borrowed in the past. Based on cardholder's 100 history, credit reporting agency 130 calculates a credit score, which is a numerical index representing an estimate of a cardholder's 100 financial creditworthiness.

Funds are transferred between bank 110 and creditor 120 using fund-transfer system 140. Fund transfer system 140 may be a wire transfer network, automated clearing house ("ACH"), or other communication system of a clearing house or other association of financial institutions through which a payment may be transmitted to the creditor 120.

Information, whether in writing, a record, or any other type of notice, may be "sent" by deposit in the mail, electronically transmitted, or communicated by any other usual means causing the information to be received.

According to one embodiment, cardholder 100 has established credit account 125, such as a credit card or other revolving debt, with creditor 120. In association with credit account 125, creditor 120 offers a no-delinquency service wherein, credit account 125 is associated with cardholder's 100 bank account 115. In accordance with the conditions of the no-delinquency service, creditor 120 automatically transfers funds from bank account 115 to the credit account 125 prior to the date at which the cardholder 100 would be reported delinquent to credit agency 130. Before transferring the funds, creditor 120 may send notice to cardholder 100. If cardholder 100 chooses, he or she may preempt the no-delinquency service by paying the required payment to the creditor 120. In such a case, creditor 120 may be notified of such payment, either in advance or concurrently with the receipt of the payment. However, if no action is taken by cardholder 100 before a predetermined payment date, the no-delinquency service may transfer funds to creditor 120 regardless of the cardholder's 100 action. In some instances, creditor 120 may send the cardholder 100 a request for authorization to transfer funds from the bank account 115. Authorization may be required in cases in which the payments by the no-delinquency service are non-recurring.

Figure 2:
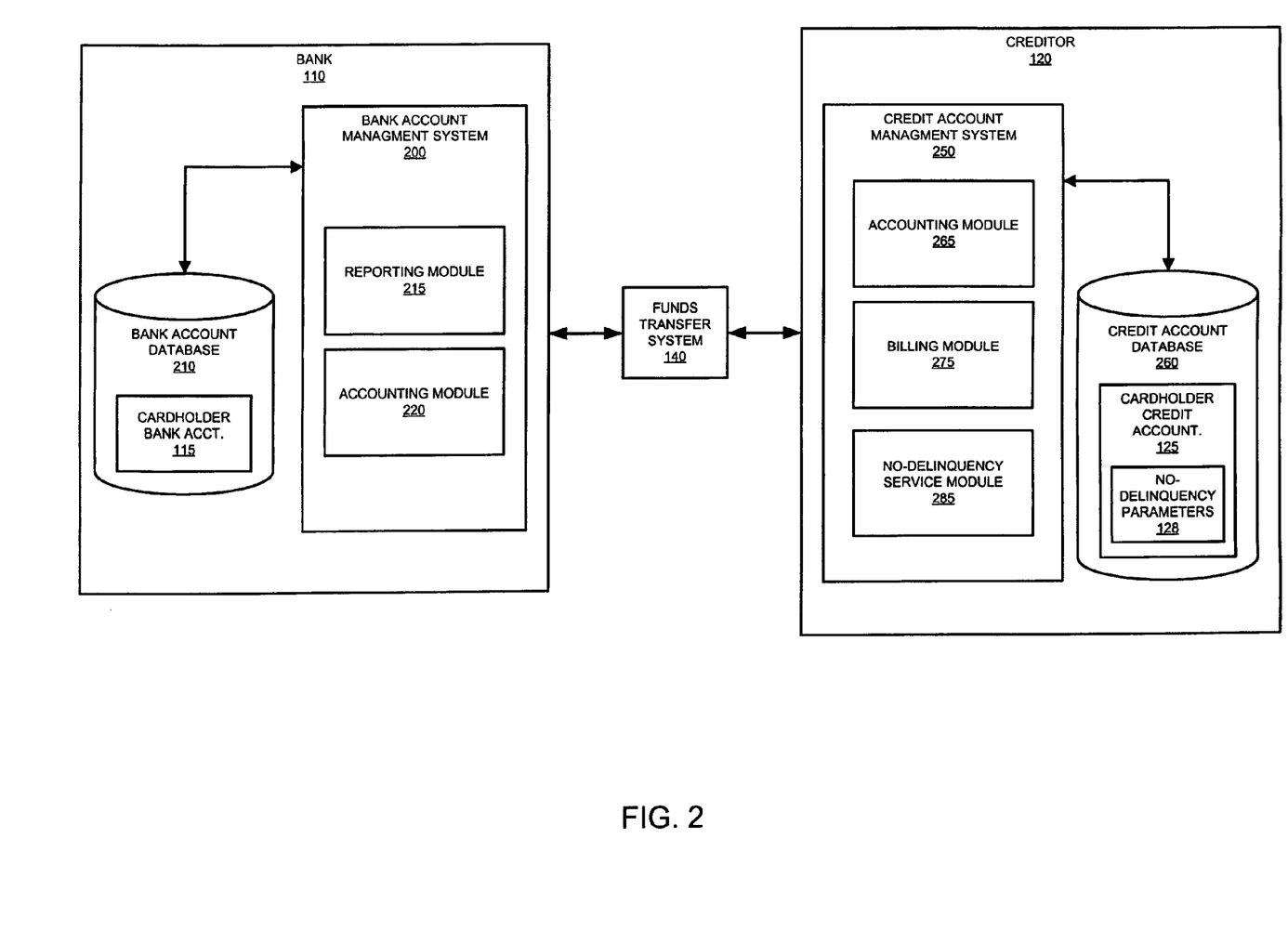
FIG. 2 illustrates a block diagram of an exemplary computerized system environment, consistent with an embodiment of the present invention.

FIG. 2 illustrates an exemplary computerized environment system consistent with an embodiment of the present invention. As illustrated in FIG. 2, bank 110 includes a bank account management system 200 and a bank account database 210. Bank account management system 200 may further comprise an electronic data processing system or processor (not shown) executing computer instructions for various software modules related to bank's 110 operations including reporting module 215 and accounting module 220. The electronic data processing system or processor may be, for example, a personal computer, minicomputer, microprocessor, workstation or similar computer platforms typically employed in the art. In one embodiment, bank account management system 200 may include a central processing unit, memory, display, input/output devices and mass storage device.

Bank account database 210 stores a plurality of account records including cardholder's 100 bank account 115. The database 210 may be stored locally to bank account management system 200 on a mass storage device, or it may be comprised of one or more storage devices in a plurality of locations whereby data is accessed by bank account management system 200 over a communications network. The network may be, for example, a pole-switched telephone network, local area network, wide area network, or the Internet. Alternatively, the database 210 may be a data warehouse accessed by a plurality of creditor computers. For the sake of example, only a single storage system comprised of a single storage device at a single location is illustrated in FIG. 2.

Reporting module 215, amongst other tasks, generates periodic statements for cardholder 100 to provide information including the status of bank account 125, credits, debits and transactions over a period. Bank accounting module 220 processes debits and credits to the bank account 115, updates bank account 115 accordingly, and supplies transaction data to reporting module 215.

Creditor 120, as exemplified, includes a credit account management system 250 and a credit account database 260. Credit account management system 250 may comprise a computer or other electronic data processing system for executing computer instructions for various software modules related to creditor's 120 operations. For example, the electronic data processing system executes computer instructions for modules 265, 275, and 285 related to creditor's 120 operations. The electronic data processing system may be a personal computer, minicomputer, microprocessor workstation or similar computer platforms typically employed in the art. In one embodiment, credit account management system 250 includes a central processing unit, memory, display, input/output devices and mass storage device. Creditor account database 260 processes a plurality of account records associated with a plurality of cardholders including cardholder's 100 credit account 125. Database 260 may be stored locally to credit account management system 250 on a mass storage device, or may be comprised of one or more storage devices in a plurality of locations whereby data is accessed by the creditor computer over a network. The network may be, for example, a pole-switched telephone network, local area network, wide area network, or the Internet. Alternatively, database 260 may be a data warehouse accessed by a plurality of creditor computers. For purpose of illustration, only a single storage system comprised of a single storage device at a single location is illustrated in FIG. 2.

Cardholder credit account 125 contains information typical of a credit account including, for example, identification of cardholder 100, account number, cardholder's 100 contact information (e.g., address, telephone numbers, e-mail address), interest rate, maximum balance, current balance, last payment date, required payment date, amount due, incentive information, and historical transaction data. In addition, if cardholder 100 is enrolled in a no-delinquency service, no-delinquency parameters 1288 may be associated with the cardholder credit account 125. For instance, parameters 128 may include enrollment information, account identification, timing for transfer of funds, requirements for notification, timing of notification, and requirements for authorization.

Creditor accounting module 265 processes debits and credits to the credit account 125 and updates credit account 125 accordingly. Billing module 275, among other tasks, receives data from accounting module 265 to generate periodic statements reporting to cardholder 100 the status of credit account 125, including transactions over the period, due date of payment for the period, and minimum payment due for the period. In addition, creditor accounting module 265 determines whether cardholder's credit account 125 is delinquent and, if so, sends a delinquency report to credit reporting agency 130. Credit account 125 may be considered delinquent if cardholder 100 fails to make a required periodic payment by a specified date.

In addition, credit account management system 250 includes no-delinquency service module 285 for processing data in accordance with certain aspects of the no-delinquency service offered by creditor 120. No-delinquency service module 285 receives data from accounting module 265 regarding whether cardholder credit account was credited with a required payment from cardholder 100, and whether cardholder credit account 125 is currently delinquent. Furthermore, no-delinquency service module 285 accesses credit account 125 and retrieves no-delinquency parameters 128 (e.g., 310-360). Based on the data received from accounting module 265, and credit account 125, no-delinquency service module 285 determines whether to issue a notice of pending delinquency to cardholder 100, request authorization from cardholder 100 to transfer funds from bank account 115, and/or transfer funds from cardholder bank account 115 to prevent credit account 125 from being reported as delinquent.

In one embodiment, the features disclosed above are automated by an electronic data processing system. However, the same processes, or portions thereof, may be executed manually. Further, although the software modules are illustrated as independent units in FIG. 2, they may instead be combined in fewer or greater numbers of modules. Computing systems employed in either the bank account management system 200 or the credit account management system 250 may be embodied as a computer system implementing instructions stored on a computer readable medium. The computer system may be a single unit or, alternatively, may be a plurality of computers located in a plurality of locations and in communication over a network.

FIG. 3 provides a schematic illustration of the no-delinquency parameters 128 maintained by creditor 120 to provide an association between the cardholder's bank account 115, and cardholder's credit account 125. Further, as explained in greater detail below, no-delinquency parameters 128 may contain various parameters and/or limitations obtained from cardholder 100 during enrollment and/or at a later time. In one embodiment, the f no-delinquency parameters 128 include: cardholder identifier 310, credit card account number 315, bank account number 320, bank account type 325, bank account limitations 330, frequency of no-delinquency payments 335, payment date of no-delinquency payments 340, payment amount of no-delinquency payments 345, notice requirements 350, authorization requirements 355, and authorization method 360. No-delinquency parameters 128 may contain additional entries (not shown) such as, a second account that may be debited in the event bank account 115 is unavailable. In addition, no-delinquency parameters 128 may contain contact information for cardholder 100, such as the cardholder 100 telephone number, mailing address, email address, and by which contact means cardholder prefers to have information sent.

Data in no-delinquency parameters 128 illustrated in FIG. 3 is exemplary. Any combination of conditions and/or preferences 335-355 may be associated with cardholder 100. Although, in the embodiment discussed above, the conditions and/or preferences 335-360 are designated by cardholder 100 upon enrollment, they may be assigned automatically by the system and/or modified by cardholder 100 at a later time.

Figure 4:
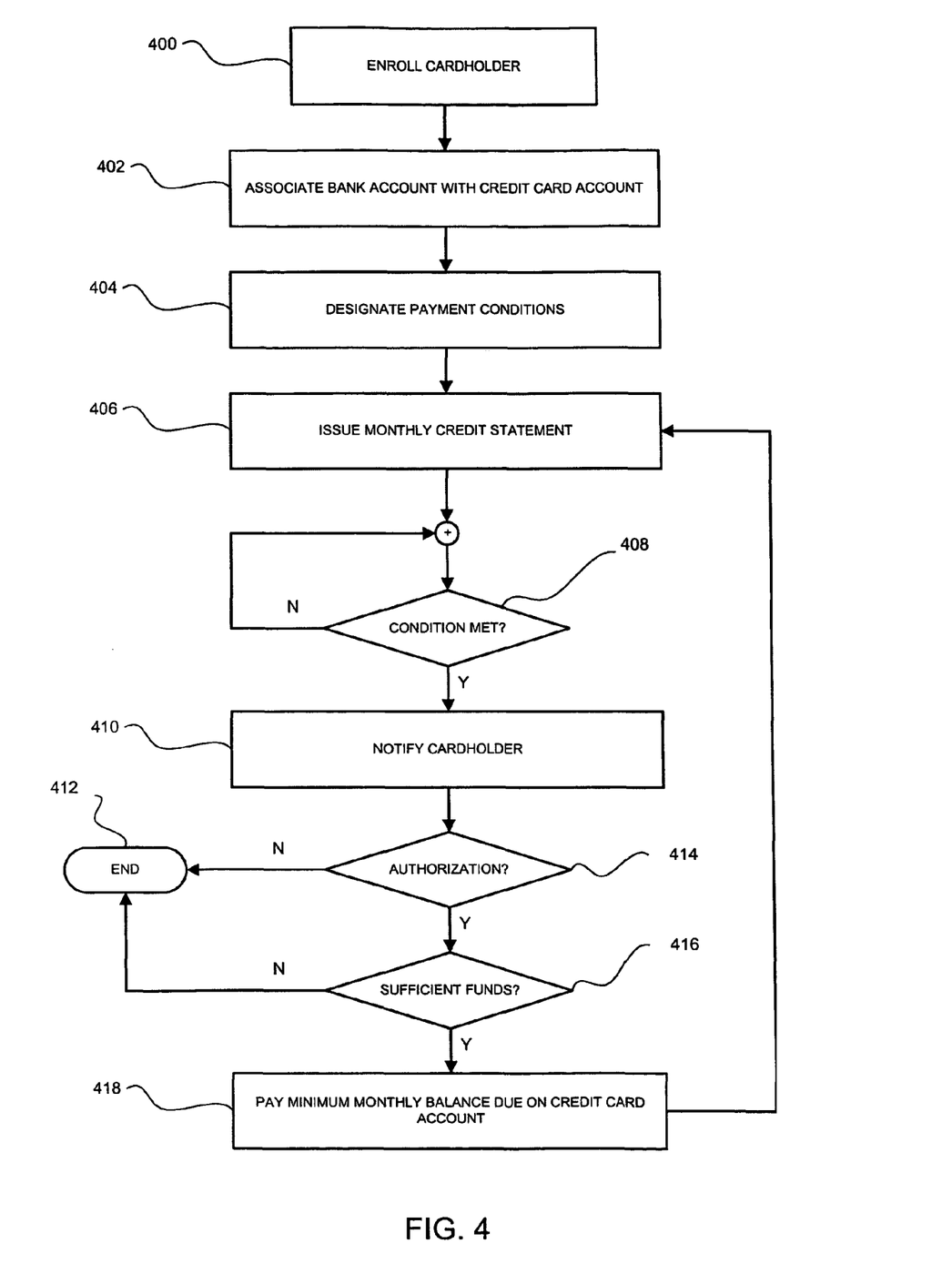
FIG. 4 illustrates a flowchart of an exemplary process, consistent with an embodiment of the present invention.

FIG. 4 illustrates an exemplary process, consistent with an embodiment of the invention, for providing a no-delinquency service. At stage 400, creditor 120 and cardholder 100 establish an agreement enrolling the cardholder 100 in the no-delinquency service. Cardholder may submit enrollment information via various methods including paper application form, telephone, mail, over a network or over the World Wide Web using a web page provided by creditor. In one embodiment, enrollment of cardholder 100 includes collecting data for the no-delinquency service, including account information, account limitations and cardholder preferences. As illustrated in FIG. 3, the no-delinquency parameters 128 may contain data associating cardholder's name 310, cardholders credit account identifier 315, and cardholder's bank account identifier 320. By way of this information, the cardholder's bank account 115 is associated with the cardholder's credit account 125 (stage 402). At the same time, the cardholder provides information on bank account type 325 and bank account limits 330. Bank account type 325 may designate the account as, for example, a deposit, demand, time, savings, passbook, share, draft, credit, or the like. Bank account limits 330 may include, minimum balance amount, maximum overdraft amount, or maximum credit. In addition, cardholder 100 may designate a second account (not shown) that may be debited in the event bank account 115 identified with bank account number 320 is unavailable or contains insufficient funds. For example, the second account may be debited in lieu of bank account 115 if transferring funds from the account to avoid being reported as delinquent will cause bank account 115 to drop below a minimum balance required by bank 110, or exceed a maximum overdraw amount allowed by bank 110.

Enrollment may further include cardholder 100 designating the conditions and/or preferences (stage 404) for execution of the no-delinquency service including the frequency of no-delinquency payments 335, payment date of no-delinquency payments 340, and payment amount of no-delinquency payments 345, notice requirement 350, authorization requirement 355, and authorization method 360.

With regard to frequency of no-delinquency payments 335, cardholder may designate whether bank account 115 should be debited "as needed" or periodically (e.g., monthly). Where cardholder 100 designates payment "as needed", bank account 115 is only debited by no-delinquency service in periods that cardholder's 100 credit account 125 may be reported as delinquent. In other words, if credit account 125 is not due to be reported to credit reporting agency 130 by credit account management system 250 for being delinquent, then no funds are transferred from bank account 115 to pay credit account 125 by no-delinquency module 285. In one embodiment, cardholder 100 authorizes creditor 120 to debit his or her bank account 115 periodically (e.g., monthly). By authorizing periodic payments, the cardholder 100 avoids the need to authorize each payment as may be required by regulation and/or statute in the case of nonrecurring payments. Notably, even though creditor 120 is authorized to transfer funds from bank account 115 every period, in periods where the credit account is not delinquent, the creditor may transfer from bank account 115 the amount of zero dollars. As such, no future authorization is required when the system, at a later date, debits bank account 115 an amount necessary to avoid reporting of delinquency. In another embodiment, creditor 120 may be required to obtain cardholder's 100 authorization each time bank account 115 is debited. Thus, in the case where the cardholder 100 authorizes non-recurring payments, cardholder 100 may be required to provide authorization to the creditor 120 to transfer funds from the bank account 115. This authorization may by sent by cardholder 100 in response to notification of delinquency sent by the creditor 120 prior to reporting cardholder 100 as delinquent to credit agency 130.

With regard to payment date 340, cardholder 100 may provide the no-delinquency service with preferences for when bank account 115 is debited by the no-delinquency module 285. In some cases, cardholder 100 may elect for funds to be transferred at a specific time (e.g., day or week) each month. In other cases, cardholder may designate that funds should be transferred a fixed number of days prior to the end of a payment period (e.g., 10 days). The actual date of payment may be a predetermined time before the notice of delinquency is issued. For example, funds will be transferred five days before delinquency notice is issued unless the cardholder 100 notifies the creditor otherwise. Alternatively, the actual date of payment may be a predetermined time after providing notice to the cardholder 100. For example, funds may be transferred two weeks after sending notice of delinquency unless the cardholder 100 notifies the creditor otherwise.

With regard to payment amount 345, cardholder 100 may provide the no-delinquency service with preferences the amount transferred to the creditor 120. The amount may be, for example, the minimum amount due, twice the minimum amount due, or fixed value greater than the amount due to avoid reporting to the credit agency 130. As stated previously, in one embodiment, the no-delinquency service does not transfer funds from the card holder's bank account 115 each month. Instead, the system debits bank account 115 only when the report to a credit agency 130 is imminent (e.g., over 30 days overdue). Of course, if desired, the no-delinquency service may operate as a typical automatic payment system in which the creditor 120 automatically debits the cardholders bank account 115 each month for a particular amount (e.g., minimum balance due).

With regard to notice 350, cardholder 100 may provide the no-delinquency service with preferences for when to notify the cardholder 100 prior to debiting bank account 115. Further, the cardholder 100 may specify conditions under which he or she is given notice by the no-delinquency service. For instance, cardholder 100 may prefer notice only when transferring funds from bank account 115 to credit account 125 will, based on account limits 330, cause bank account 115 to drop below a minimum balance, exceed a maximum overdraw, or exceed a maximum amount.

With regard to authorization, cardholder 100 may provide the no-delinquency service with requirement for authorization prior to debiting bank account 115. In particular, cardholder 100 may specify that no funds be transferred without authorization from cardholder 100. Authorization may be sent by cardholder 100 in response to notice from the no-delinquency service, or authorization may be sent independently.

After each monthly credit statement is issued (stage 406), the no-delinquency module 285 determines if no-delinquency parameters 128 are satisfied (stage 408). If so, in accordance with no-delinquency parameters 128, no-delinquency module 285 may send notice to cardholder 100 of the cardholder's impending delinquency (stage 410), thereby giving the cardholder 100 an opportunity to pay the amount due to creditor 120 without relying on the no-delinquency service. In the case where creditor 120 is not authorized to make reoccurring transfers, no-delinquency module 285 may also send the cardholder 100, as part of the notice or separately, a request for authorization to transfer funds from the cardholders bank account 115 (step 414).

If no-delinquency module 285 determines that (i) no-delinquency parameters 128 are met, (ii) cardholder 100 has not paid or sent notice of payment, and (iii) payment is authorized (stage 414), then no-delinquency module 285 transfers the predetermined amount of funds from the cardholder's bank account 115 to the cardholder's credit account 125 (stage 418). In some cases, where the cardholder 100 has not authorized reoccurring payments to the creditor from the bank account 115, the funds will not be transferred unless the cardholder 100 has provided authorization to creditor 120 for the particular transfer. In addition, if the bank account 115 has insufficient funds to transfer amount from the account, the transfer may be cancelled (stages 416 and 412). A payment order issued by the creditor 120 to the bank (stage 418) may be sent orally, electronically, or in writing, to pay the to the creditor 120. The instruction may be sent by the creditor 120 directly to the bank 110 or, funds transfer system 140, or communication system for transmittal to the bank 110.

Figure 5:
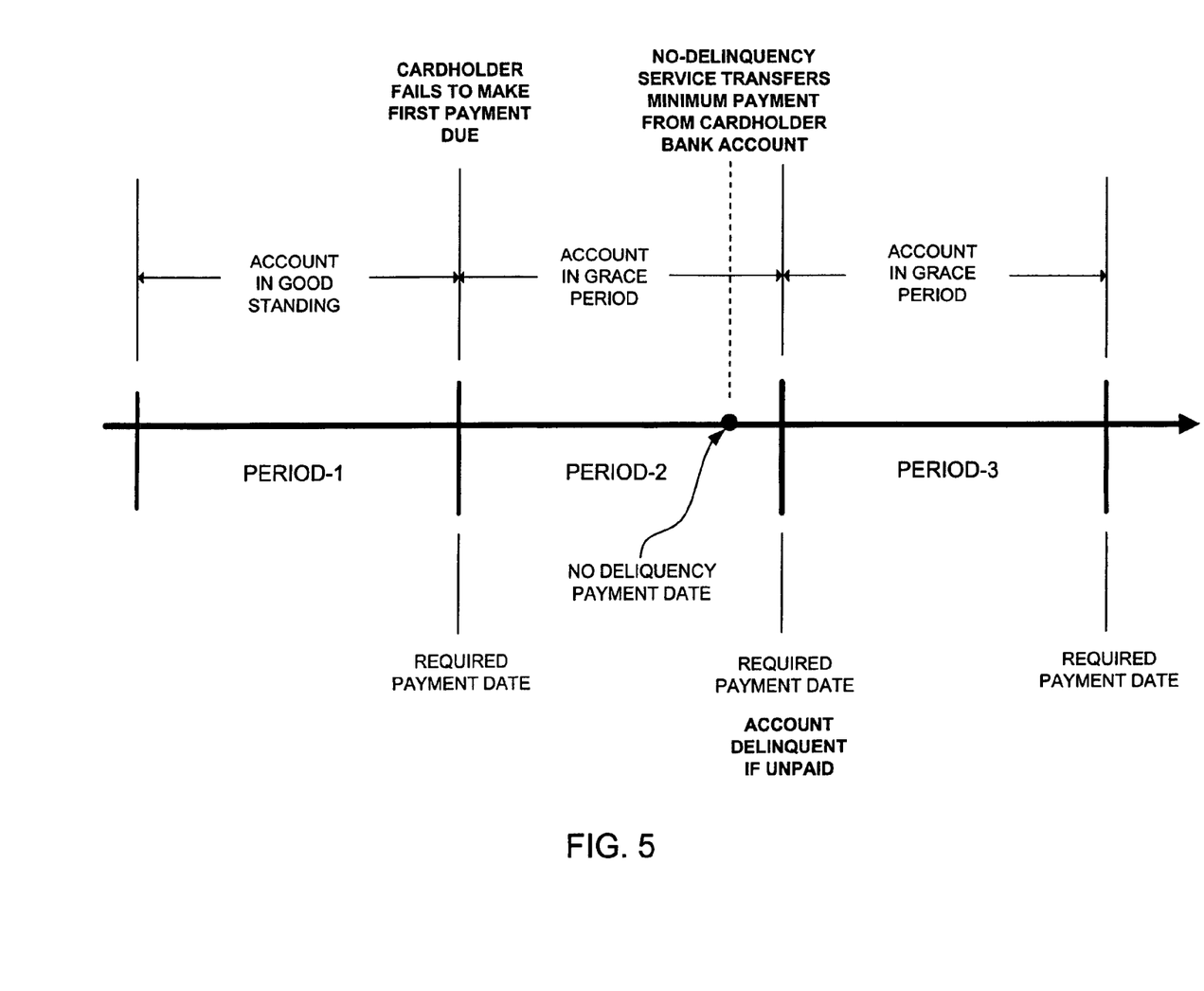
FIG. 5 illustrates an exemplary time flow of a no-delinquency service, consistent with an embodiment of the invention.

FIG. 5 illustrates an exemplary time flow of a no-delinquency service. In Period-1, cardholder's credit account 125 carries a balance, but is in good standing. During the period, billing module 275 sends cardholder 100 an account statement informing cardholder 100 of his account balance, minimum required payment, and due date for payment. At the end of Period-1, however, cardholder 100 fails to pay at least the minimum required payment. As a result, accounting module 265 designates credit account 125 as delinquent. During Period-2, billing module 275 sends cardholder 100 an account statement informing cardholder 100 of his account balance, minimum required payment, due date for payment, and notification that the payment on the account is past-due. Again, cardholder 100 fails to pay or authorize payment. Thus, the credit account management system 250, via the accounting module 265, determines that it will report the cardholder's delinquency to credit agency 130 at the end of Period-2 if the required payment is not received. Prior to the end of Period-2, on the no-delinquency payment date 340 identified in cardholder's 100 no-delinquency parameters 128, no-delinquency module 285 determines the cardholder 100 has not paid the required payment to creditor 120. In response, based on no-delinquency parameters 128, no-delinquency module 285 automatically transfers the required payment from the cardholder's bank account 115 to creditor 120 on no-delinquency payment date 340. As a result, accounting module 265 credits cardholder's credit account 125 with the required payment, preventing credit account management system 250 from reporting credit account 125 as delinquent to credit reporting agency 130.

For purposes of explanation only, certain aspects of the present invention are described herein with reference to the components or modules illustrated in FIGS. 1 and 2. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 3 and 4 are exemplary and not intended to be limiting. Thus, other method steps may be used, and even with the methods depicted in FIGS. 3 and 4, the particular order of events may vary without departing from the scope of the present invention. Moreover, certain steps may not be present and additional steps may be implemented in FIGS. 3 and 4. Also, the processes described herein are not inherently related to any particular apparatus and may be implemented by any suitable combination of components.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method comprising:
  enrolling a cardholder in an automated service for preventing report of delinquency on a credit account owned by the cardholder to a credit agency;
  associating, by a processor, a bank account owned by the cardholder with the credit account;
  designating, by the processor, a threshold date before the report of delinquency to the credit agency and after the credit account becomes delinquent;
  determining, by the processor, if the credit account is delinquent on the threshold date; and
  transferring, by the processor, funds from the bank account to the credit account on the threshold date if the credit account is delinquent on the threshold date.

2. The method of claim 1, wherein the credit account is a revolving credit card account.

3. The method of claim 2, wherein the funds equal a minimum amount due on a balance of the revolving credit card account to prevent reporting of the revolving credit account as delinquent to a credit agency.

4. The method of claim 1, wherein enrolling a credit cardholder comprises obtaining authorization from the cardholder to make periodic transfers from the cardholder's bank account.

5. The method of claim 4, where the method further comprises debiting the cardholder's bank account for zero dollars in periods when the credit account is not delinquent.

6. The method of claim 1, wherein transferring funds comprises obtaining cardholder authorization prior to transferring funds from the bank account.

7. The method of claim 1, wherein the step of transferring funds comprises sending notice to the cardholder prior to transferring funds from the bank account.

8. The method of claim 1, wherein the funds are electronically transferred via a fund transfer system.

9. A computer-implemented method for managing a credit card account, comprising:
  enrolling a credit cardholder, the cardholder having a bank account and a credit card account, the credit card account requiring periodic payments on a periodic payment date of a balance owed on the credit card account and having a credit agency reporting date that is a predetermined number of periods after a period in which a required payment is not paid by the cardholder;
  associating, by a processor, the bank account with the credit card account;
  designating, with the processor, a threshold date prior to the credit agency reporting date and after the periodic payment date;
  determining, by the processor, if the cardholder has paid at least the required payment on the credit card account; and
  transferring, by the processor, the required payment from the bank account to the credit card account on the threshold date if the cardholder has not paid at least the required payment on the credit card account.

10. A computer-implemented method for transferring funds, comprising:

enrolling a customer, the customer having a bank account and a financial account, wherein the financial account is delinquent after expiration of a first time period in which a first required payment is not paid, and delinquency of the financial account is reported to a credit agency after expiration of a second time period in which a second required payment is not paid;

associating, by a processor, the bank account with the financial account;

determining, by the processor, if the second required payment is paid before the predetermined time; and transferring, by the processor, the second required payment from the bank account to the financial account a predetermined amount of time before the expiration of the second time period if the second required payment is not paid before the predetermined time.

11. The method of claim 10, wherein the financial account is one of a credit card account, a revolving credit account, a loan account, or a mortgage account.

12. A system comprising:

means for enrolling a cardholder in an automated service for preventing report of delinquency on a credit account owned by the cardholder to a credit agency;

means for associating a bank account owned by the cardholder with the credit account;

means for designating a threshold date before the report of delinquency to the credit agency and after the credit account becomes delinquent;

means for determining if the credit card account is delinquent on the threshold date; and means for transferring funds from the bank account to the credit account on the threshold date if the credit account is delinquent on the threshold date.

13. The system of claim 12, wherein the credit account is a revolving credit card account.

14. The system of claim 13, wherein the funds equal a minimum amount due on a balance of the revolving credit card account necessary to prevent reporting of the revolving credit card account as delinquent to the credit agency.

15. The system of claim 12, wherein the means for enrolling a credit cardholder comprises means for obtaining authorization from the cardholder to make periodic transfers from the bank account.

16. The system of claim 15, further comprising means for debiting the bank account for zero dollars in periods when the credit account is not delinquent.

17. The system of claim 12, wherein the means for transferring funds comprises means for sending cardholder authorization prior to transferring funds from the bank account.

18. The system of claim 12, further comprising means for sending notice to the cardholder prior to transferring funds from the bank account.

19. The system of claim 12, wherein the funds are electronically transferred via a fund transfer system.

20. A system for managing a credit card account, comprising:

means for enrolling a credit cardholder, the cardholder having a bank account and a credit card account, the credit card account requiring periodic payments on a periodic payment date of a balance owed on the credit card account and having a credit agency reporting date that is a predetermined number of periods after a period in which a required payment is not paid by the cardholder;

means for associating the bank account with the credit card account, means for designating a threshold date prior to the credit agency reporting date and after the periodic payment date;

means for determining if the cardholder has paid the required payment on the credit card account; and means for transferring a payment from the bank account to the credit card account on the threshold date if the cardholder has not paid the required payment on the credit card account.

21. A system for transferring funds, comprising:

means for enrolling a customer, the customer having a bank account and a financial account, wherein the financial account is delinquent after expiration of a first time period in which a first required payment is not paid, and delinquency of the financial account is reported to a credit agency after expiration of a second time period in which a second required payment is not paid;

means for associating the bank account with the financial account;

means for determining if the second required payment is paid before the predetermined amount of time; and means for transferring the second required payment from the bank account to the financial account a predetermined amount of time before the expiration of the second time period if the second required payment is not paid before the predetermined amount of time.

22. The system of claim 21, wherein the financial account is one of a credit card account, a revolving credit account, a loan account, or a mortgage account.

* * * * *